UNITED STATES PATENT OFFICE.

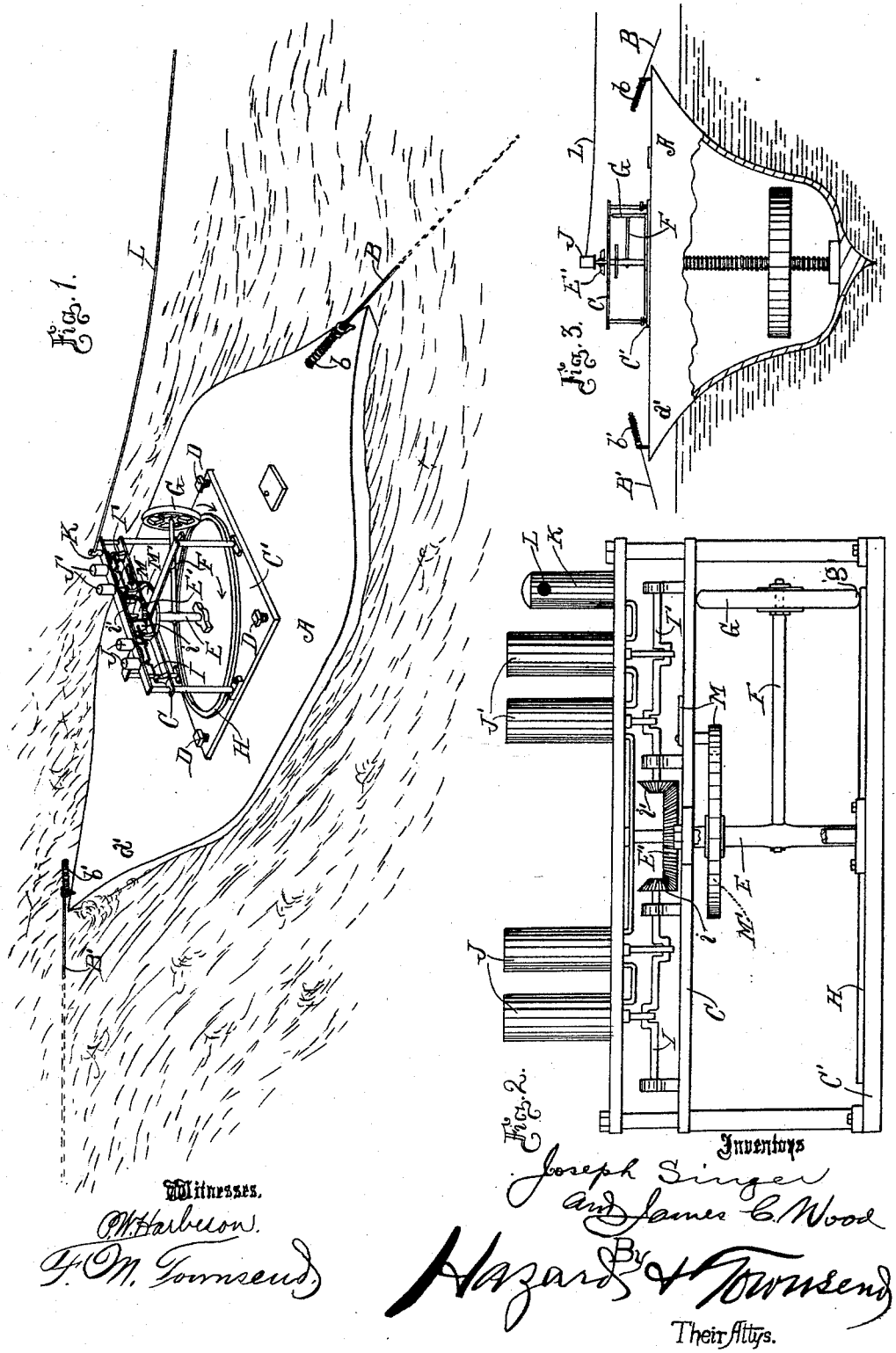

JOSEPH SINGER AND JAMES C. WOOD, OF LOS ANGELES, CALIFORNIA.

WAVE-MOTOR.

SPECIFICATION forming part of Letters Patent No. 524,490, dated August 14, 1894.

Application filed February 8, 1894. Serial No. 499,444. (No model.)

*To all whom it may concern:*

Be it known that we, JOSEPH SINGER and JAMES C. WOOD, both citizens of the United States, residing at Los Angeles, in the county of Los Angeles and State of California, have invented new and useful Improvements in Wave-Motors, of which the following is a specification.

The object of our invention is to produce a device of this class which will be cheap and simple in its construction, will give great and practically continuous power and will not be liable to be injured by heavy seas.

Our invention comprises the features of construction which we employ to secure the most effective results from our improved motor.

The accompanying drawings illustrate our invention.

Figure 1 is a perspective view of a device embodying our invention, in practical operation. Fig. 2 is a front elevation of our device, the float being omitted to contract the view. Fig. 3 is a sectional view illustrating the adjustable ballast whereby we regulate the motion of the float.

Our invention is especially designed to prevent the sudden shocks and jars common in wave motors, whereby the motor often becomes broken or inoperative.

A represents a float which is moored fore and aft by cables B B' which are attached to suitable anchors (not shown). Tension springs $b\ b'$ are provided to take up the slack of the cables and to allow the float to respond to the action of the swells.

C is a frame which is mounted upon a platform C' which is provided at each corner with a set screw D or other suitable means whereby the platform may be leveled.

E is a vertical power shaft which is journaled in the frame C and is provided near its upper end with a beveled cog wheel E'.

F is a lever which has one end connected with or fixed to the power shaft E. On the outer end of the lever F is journaled an actuating weight wheel G.

H is a circular track which is arranged to support the wheel G and to allow it to travel around the shaft E. The track is flat and the tread $g$ of the wheel G is rounded in order to prevent friction between the track and the wheel.

I I' are horizontally arranged driving shafts which are each journaled in the frame C and are provided respectively with beveled cog wheels $i\ i'$ which are arranged to mesh with the beveled cog wheel E'.

J J' represent air compressors which are operated by the driving shafts I I' respectively, and K is a storage tank from which the compressed air is conducted by means of a flexible tube L, which leads to a suitable engine (not shown) situated upon the shore or wharf and designed to utilize the force of compressed air to operate machinery.

M is a brake which operates upon a wheel M' which is fixed to the power shaft E.

We provide means whereby we are enabled to regulate the pitch or movement of the float, to cause it to pitch in the swells to any degree desired, to enable us to regulate the movement of the float to cause the weight wheel to be carried around the shaft in one direction. That is to say, when the float is in the position shown in Fig. 1, the wheel will roll down toward the stern of the float, and its momentum will carry it around toward the left in the direction of the arrow; now if the float is tipped in the opposite direction, with the bow down and the stern up, after the wheel has nearly expended its force, the wheel will thus be caused to roll downward toward the bow of the float, and if the position of the float is again reversed at the proper time, the wheel will travel around the shaft continuously in the same direction.

The means which we provide to enable us to regulate the motion of the float to secure the best results from the weight wheel consists of the float A provided with suitable ballast and with suitable means for raising and lowering the ballast with relation to the float to thereby shift the center of oscillation of the float. As shown in the drawings, such means consist of the ballast wheel O which is arranged upon a vertical screw threaded shaft O' secured to the float; the wheel O is raised and lowered by rotating the wheel to screw it up or down along the shaft to thereby adjust it to shift the center of oscillation of the float.

When it is desired to have the float pitch heavily, the ballast wheel O is screwed upward along the shaft O' to thus raise the center of oscillation of the float; when it is desired to cause the float to ride steadily, the wheel is screwed downward along the shaft to near the bottom of the float; thus lowering the center of oscillation and causing the float to ride steadily.

While we consider the means shown for adjusting the ballast to be preferable, other means may be employed without departing from the spirit of our invention.

In practice the float A is designed to be taken into still water where the platform C' is leveled by means of the set screws D. Then the float is towed to the point where it is desired to utilize the power, and is anchored fore and aft with the bow a' pointing out to sea. It is designed to anchor the float where it will be in the long swell and the ballast wheel O is adjusted to make the motion as regular as possible.

The tube L is connected to the tank K and with the engine upon the shore or wharf, (not shown) and the device is ready for operation.

The operation is as follows: The swells operating upon the float A causes the float to roll and pitch back and forth and up and down. The wheel G which is made of sufficient weight to give the power required, always rolls toward the lowest point, and its weight operates, through the medium of the lever F to rotate the power shaft E and cog wheel E', which operates the driving shafts I I' and compressors J J', to compress air to drive the engine upon the shore.

Our improved motor may be utilized for pumping water to supply power, or it may be utilized for operating fog whistles, or for any other purpose where wave power can be utilized.

By arranging the weight in the shape of a wheel, we get the most effective results from the weight employed for the reason that we thus bring the point of attachment of the lever of the power shaft at a distance above the point of support for the weight, and the tossing of the float causes the power shaft to swing the weight in the same manner a whip lash is swung by a whip stock.

The motion of the weight is utilized whether the wheel makes a full revolution, or only a partial revolution, and no matter how heavily the float may toss, the weight cannot injure the float.

We are aware that it has been proposed to operate a wave motor by means of weights, each arranged at the end of a lever and mounted upon anti-friction wheels running upon a semicircular track, and operating a shaft connected with segmental cog racks which are arranged to drive air compressors. This arrangement is liable to be broken by heavy pitching and tossing of the vessel for the reason that stops must be provided to check the weight at its limit of movement in each direction and the pounding of the weights upon these stops will defeat the object sought to be attained by us.

We do not claim broadly the use of a weight arranged at the end of a horizontal shaft and to swing only partially around such shaft, but we do claim a weight which consists of a heavy wheel of large diameter journaled upon the end of the shaft, and arranged to run upon a circular track extending entirely around the horizontal shaft, so that the weight may make a complete revolution around the shaft and will meet with no obstruction at any point of its travel to cause pounding and breaking of the device. By arranging the weight in the form of a wheel, we avoid the liability of the strain upon the wheel being so great as to cause the wheel to break, and furthermore we gain a large amount of power from the accumulated centrifugal force which is thus stored in the weight, and furthermore by increasing the diameter of the wheel, the weight responds more easily to the action of the float; by this construction we also avoid placing any weight other than the weight of the shaft upon the journal of the wheel. This is very important, for the reason that the weight is in practically continuous operation, and if a heavy weight is journaled upon small wheels as heretofore customary, the friction and heavy strain upon the journals of the wheels will soon render the device practically inoperative, and necessitate frequent and expensive repairs.

Now, having described our invention, what we claim as new, and desire to secure by Letters Patent, is—

1. The combination of the float; the vertical power shaft journaled upon such float; the horizontally arranged actuating lever fixed at one end to the power shaft; the weight, consisting solely of a heavy wheel of large diameter journaled upon the other end of such lever, and the circular track arranged to support the wheel.

2. The combination of the float provided with the ballast; suitable means for adjusting the ballast with relation to the float to shift the center of oscillation of the float; the power shaft journaled upon such float; the actuating lever connected with such shaft; the weight attached to the lever and adapted to be swung by the shifting of the float to thereby operate the lever to rotate the shaft.

3. The combination of the float provided with the vertical screw threaded shaft; the ballast wheel arranged on such shaft and adapted to be screwed up and down therealong to shift the center of oscillation of the float; the vertical power shaft journaled upon the float; the horizontally arranged actuating lever fixed at one end to the power shaft; the weight wheel journaled upon the other end of such lever, and the circular track arranged to support the wheel.

4. The combination of the float provided with the frame; the vertical power shaft journaled in such frame; the horizontally arranged lever fixed at one end to the power shaft; the actuating weight consisting of a heavy wheel of large diameter journaled upon the other end of such lever; the circular track arranged to support the wheel; the bevel cog wheel fixed to the power shaft; and the horizontally arranged driving shaft journaled in the frame and provided with the bevel cog wheel arranged to mesh with the cog wheel fixed to the power shaft.

5. A wave motor having its float provided with a screw threaded shaft, a ballast wheel arranged on such shaft and adapted to screw therealong to shift the center of oscillation of the float.

JOSEPH SINGER.
JAMES C. WOOD.

Witnesses:
ALFRED I. TOWNSEND,
JAMES R. TOWNSEND.